(12) United States Patent
Gros D'Aillon et al.

(10) Patent No.: US 9,468,041 B2
(45) Date of Patent: Oct. 11, 2016

(54) ELECTRICAL HEATING DEVICE FOR HEATING A LIQUID, METHOD FOR PRODUCING SAME, AND USE IN THE ELECTRICAL SIMULATION OF NUCLEAR FUEL RODS

(75) Inventors: Luc Gros D'Aillon, Brie et Angonnes (FR); Géraud Cubizolles, Grenoble (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 418 days.

(21) Appl. No.: 14/118,551

(22) PCT Filed: May 16, 2012

(86) PCT No.: PCT/EP2012/059187
§ 371 (c)(1),
(2), (4) Date: Feb. 3, 2014

(87) PCT Pub. No.: WO2012/156474
PCT Pub. Date: Nov. 22, 2012

(65) Prior Publication Data
US 2014/0151363 A1    Jun. 5, 2014

(30) Foreign Application Priority Data

May 18, 2011 (FR) ...................... 11 54336

(51) Int. Cl.
*H05B 3/78*  (2006.01)
*H05B 3/44*  (2006.01)
(Continued)

(52) U.S. Cl.
CPC .......... *H05B 1/0244* (2013.01); *G21C 17/001* (2013.01); *G21C 17/06* (2013.01);
(Continued)

(58) Field of Classification Search
None
See application file for complete search history.

(56) References Cited

U.S. PATENT DOCUMENTS 2,253,981 A * 8/1941 Peyches ............... H05B 3/66
                                                  174/9 F
3,898,431 A * 8/1975 House ................... H05B 3/48
                                                  136/233
(Continued)

FOREIGN PATENT DOCUMENTS

CA        1264062        12/1989
CA        1264062 A1     12/1989
(Continued)

OTHER PUBLICATIONS

"Dummy Fuel Rod," JP2010-139420A, Akiba et al, Jun. 2010, partial translation & BIB data sheet.*
(Continued)

*Primary Examiner* — Joseph M Pelham
(74) *Attorney, Agent, or Firm* — Nixon Peabody LLP; Khaled Shami

(57) ABSTRACT

A device for the electrical heating of a liquid with high thermal flow, according to which the resistor in tubular form and supplied with direct current can indirectly heat the liquid by conduction through an electrically insulating and thermally conductive intermediate element that surrounds it with direct mechanical contact, the assembly consisting of tubular resistor and intermediate element being jacketed by a sheath intended to be immersed, over at least a major part of the length thereof, in the liquid to be heated. The preferred application is the electrical simulation of nuclear fuel rods intended to be assembled in power reactors, of the PWR but also RNR-Na type.

20 Claims, 3 Drawing Sheets

(51) Int. Cl.
  *G21C 17/06* (2006.01)
  *G21C 21/02* (2006.01)
  *G21C 19/08* (2006.01)
  *H05B 1/02* (2006.01)
  *G21C 17/00* (2006.01)
  *H01C 17/02* (2006.01)
  *H05B 3/03* (2006.01)
  *H05B 3/42* (2006.01)

(52) U.S. Cl.
  CPC ............ *G21C 21/02* (2013.01); *H01C 17/02* (2013.01); *H05B 3/03* (2013.01); *H05B 3/44* (2013.01); *H05B 3/78* (2013.01); *H05B 3/42* (2013.01); *Y10T 29/49083* (2015.01)

(56) References Cited

U.S. PATENT DOCUMENTS

| | | | | |
|---|---|---|---|---|
| 3,916,444 A * | 10/1975 | Alliston | ............... | G09B 9/00 376/217 |
| 3,988,565 A * | 10/1976 | Hill | ............... | H05B 7/16 219/121.11 |
| 3,999,067 A * | 12/1976 | Foster | ............... | G01B 15/00 378/51 |
| 4,112,410 A * | 9/1978 | Wrob | ............... | H01C 3/20 29/611 |
| 4,326,122 A | 4/1982 | McCulloch et al. | | |
| 4,848,616 A * | 7/1989 | Nozaki | ............... | F24H 9/0047 204/196.11 |
| 5,026,516 A * | 6/1991 | Taylor | ............... | C22C 16/00 376/414 |
| 5,073,336 A * | 12/1991 | Taylor | ............... | C22C 16/00 376/414 |
| 5,200,144 A * | 4/1993 | Berta | ............... | G21C 17/001 376/463 |
| 5,331,676 A * | 7/1994 | Lambert | ............... | G21C 21/02 373/145 |
| 5,553,109 A | 9/1996 | Matzner | | |
| 6,240,624 B1 * | 6/2001 | Hironaka | ............... | F24F 3/166 29/611 |
| 6,800,835 B1 * | 10/2004 | Sims, III | ............... | H05B 6/62 219/548 |
| 2007/0201608 A1 * | 8/2007 | Model | ............... | G01N 17/02 376/417 |
| 2009/0279880 A1 | 11/2009 | Belkin | | |
| 2009/0308144 A1 * | 12/2009 | Dorsch | ............... | G01N 17/02 73/86 |
| 2013/0259181 A1 * | 10/2013 | Pontillon | ............... | G21C 17/06 376/247 |
| 2014/0034635 A1 * | 2/2014 | Bass | ............... | E21B 36/04 219/542 |
| 2015/0098485 A1 * | 4/2015 | Pontillon | ............... | G21C 17/001 374/55 |
| 2015/0323390 A1 * | 11/2015 | Gros D'Aillon | ............... | G01K 1/026 374/179 |

FOREIGN PATENT DOCUMENTS

| | | |
|---|---|---|
| GB | 1336879 | 11/1973 |
| GB | 1567769 | 5/1980 |
| JP | S4831564 | 9/1973 |
| JP | 59-16621 | 1/1984 |
| JP | 59-57196 | 4/1984 |
| JP | 2006-097242 | 4/1984 |
| JP | 60-257963 | 12/1985 |
| JP | 01-274957 | 2/1989 |
| JP | 01-195562 | 7/1989 |
| JP | 04-291191 | 10/1992 |
| JP | 06-252292 | 9/1994 |
| JP | 10-091567 | 4/1998 |
| JP | 2000-265729 | 9/2000 |
| JP | 2011-159745 | 8/2011 |

OTHER PUBLICATIONS

International Search Report in PCT/EP2012/059187 mailed Apr. 14, 2012.
Preliminary Search Report in French application FR 1154336 mailed Jan. 9, 2012.
International Preliminary Report on Patentability in PCT/EP2012/059187 mailed Nov. 18, 2013.

* cited by examiner

ELECTRICAL HEATING DEVICE FOR HEATING A LIQUID, METHOD FOR PRODUCING SAME, AND USE IN THE ELECTRICAL SIMULATION OF NUCLEAR FUEL RODS

CROSS REFERENCE TO RELATED APPLICATIONS

This application is the national stage of International Application No. PCT/EP2012/059187, filed May 16, 2012, entitled, "Electrical Heating Device For Heating Of A Liquid, Method For Producing Same, And Use In The Electrical Simulation Of Nuclear Fuel Rods," which claims the benefit of priority of French Patent Application No. 11 54336, filed May 18, 2011, the contents of both of which are incorporated herein by reference in their entirety.

TECHNICAL FIELD

The invention concerns a novel device for the electrical heating of a liquid with high thermal flow.

The main application of the invention is the production of a novel device for the electrical simulation of nuclear fuel rods intended to be assembled in assemblies by holding grids and intended to be used in so-called power reactors, and more particularly pressurised water reactors (abbreviated to PWR). As described precisely below, the use of such a device enables the thermohydraulic qualification of fuel rods by detecting the occurrence of the boiling crisis of the liquid in which they are intended to be immersed.

The invention aims in general terms to increase the service life and quality of the existing heating devices with high thermal flow, in particular the qualification of devices for the electrical simulation of nuclear fuel rods currently existing with high thermal flows.

Although described with reference to the main application, the device according to the invention can be used for heating a liquid in which it is immersed.

PRIOR ART

In order to qualify an assembly of nuclear fuel rods intended to be used in a pressurised water power nuclear reactor (PWR), it is necessary to carry out boiling crisis tests. More precisely, one must be able to detect the occurrence of the boiling crisis. This is because the boiling crisis may be defined in general terms as a significant excursion in wall temperature for a small variation in the thermohydraulic control parameters. It results in concrete terms in the abrupt degradation of the heat exchange between a heating wall and the heat-transfer fluid that surrounds it. Thus, in a PWR reactor, the occurrence of this phenomenon could lead to the rupture of the nuclear fuel rod sheath.

Up to the present time, the devices for electrical simulation of high thermal flow nuclear fuel rods can be termed the direct heating type. This is because the sheath of the device also constitutes the element with the function of a resistor. In other words, the sheath is heated directly.

However, modern nuclear fuel assemblies, in particular those intended to be used in PWR reactors, have more complex designs and higher thermal performance than those of the assemblies already tested, which tends to invalidate the normal qualification procedures in particular with regard to the appropriateness of the devices for electrical simulation of rods assembled in an assembly.

Thus the inventors have analysed that the modern holding grids that form high current diversions may cause rapid degradation of the electrical rod simulation devices of the direct heating type: the contact points created between the protrusions on the holding grid in question and a given rod are liable to generate an overintensity of current and therefore local electrolysis, sources of rapid degradation of the rods. In fact, the inventors considered that the electrical simulation devices of the direct heating type could prevent the reliable qualification of the fuel assemblies.

Moreover, depending on the type of direct heating device necessary, the sheaths with a resistor function must be very thin in order to adapt their electrical resistance to the electrical supplies available, which is highly prejudicial to the service life of the simulation devices in question and to the possibility of reliably qualifying the assemblies.

In addition, the use of a direct-heating electrical simulation device involves electrical insulation thereof that is of high performance and reliable under the same operating conditions, which can take place only with complex technologies and materials that are expensive, but nevertheless fragile, and with a limited service life.

Finally, by definition, direct-heating electrical simulation devices cannot be used to qualify nuclear fuel assemblies intended to be immersed in an electrically conductive heat-transfer agent. However, safety studies on future so-called $4^{th}$ generation rapid neutron nuclear reactors (RNRs), the functioning of which is ensured with a sodium heat-transfer agent (RNR-Na) will also require boiling tests with high thermal flow sodium. Since sodium intrinsically has high electrical conductivity, direct-heating electrical simulation devices will not be able to be used for said boiling tests for reactors (RNRs).

Other existing electrical simulation devices may be termed the indirect heating type since the resistances or resistors consist of wires supplied with three-phase current.

These devices are not satisfactory since they generate a non-homogeneous thermal flow in a backwash profile transversely to the sheath, that is to say an azimuth backwash profile.

The aim of the invention is therefore to propose a novel device for the electrical simulation of a nuclear fuel rod with high thermal flow that does not have all or some of the aforementioned drawbacks and therefore that is reliable in generating a homogeneous thermal flow and has a long service life, in order to carry out a large number of reliable boiling tests.

Another aim of the invention is to propose a novel device for the electrical simulation of a nuclear fuel rod with high thermal flow that makes it possible to obtain boiling tests at reduced cost and with guaranteed implementation times.

A more general aim of the invention is to propose a device for the electrical heating of a liquid with high thermal flow homogeneous in azimuth, and which is reliable and has a long service life.

DISCLOSURE OF THE INVENTION

To do this, the subject matter of the invention is first of all a device for the electrical heating of liquid, characterised in that it comprises:
  a first tube made from electrically conductive material forming a resistor,
  two electrical connections each fitted in one of the ends of the resistor, the electrical connections being adapted to bring a direct current through the resistor and to make it emerge respectively, an intermediate element, made from material that is both thermally conductive and electrically insulating, surrounding, with direct mechanical contact, respectively the resistor and the two electrical connections over at least part of their length, a second tube forming a sheath, made from thermally conductive material and surrounding the thermally conductive intermediate element with direct mechanical contact, the sheath being intended to be immersed, over at least a major part of its length, in the liquid to be heated.

In other words, the solution according to the invention consists essentially of all the following:

using the same type of tubular resistor as the electrical simulation devices with direct heating currently used in order to have a high thermal flow with an axial profile imposed solely by the variation in thickness of the resistor and a homogeneous transverse profile, that is to say without azimuthal variation, supplying said tubular resistor with direct current, defining radial dimensions of the tubular resistor that are smaller so as to insulate it electrically by means of an electrically insulating but thermally conductive intermediate element, preferably with a very high thermal conduction coefficient such as boron nitride, and jacketing the assembly consisting of tubular resistor and intermediate element by means of a sheath made from thermally conductive material, with an imposed outside diameter, of the same type as rod sheaths for PWR reactors, advantageously made from metal that is non-oxidisable in demineralised water.

The electrical heating device according to the invention, which can be termed indirect (the tubular resistor indirectly heating the liquid by thermal conduction through the intermediate element and the sheath), makes it possible to obtain a high thermal flow, up to several $MW/m^2$, with the same metrological qualities that can be found on existing direct heating electrical simulation devices that have a high performance.

In other words, it is possible, by means of the device according to the invention, to qualify nuclear fuel rods intended for power reactors of the PWR type. Furthermore, because of its electrical insulation vis-à-vis the external environment, which enables it to eliminate numerous assembly constraints, it is also possible to qualify nuclear fuel rod assemblies using modern holding grids without any risk of rapid degradation of the tubular resistor, rapid degradation that prevents the finalisation of the boiling crisis tests as may be the case with the direct-heating electrical simulation devices currently existing.

In order to reduce the interface thermal resistances between the various components of the device, the direct mechanical contacts both between the intermediate element and resistor and between the intermediate element and sheath are advantageously tight fits.

It is preferably possible to provide in the device according to the invention one or more mechanical inserts housed inside the resistor, the mechanical insert or inserts being adapted to afford mechanical support of the tubular resistor. In particular, such inserts may advantageously support the tubular wall of the resistor in the case of stretching of the sheath in order to obtain a holding thereof on the whole device. Preferably again, the mechanical insert or inserts is or are made from ceramic, such as magnesia, alumina or zirconia. Ceramic inserts offer both good mechanical strength and high electrical resistivity, which are suitable for implementation of the invention.

Preferably, the tubular resistor is made from Inconel 600 or a 70/30 cupronickel alloy.

Preferably also, the electrically insulating and thermally conductive intermediate element consists of a column of a plurality of pellets pierced at their centre and stacked on one another. Mounting of the insulating element around the resistor is thus facilitated. The pellets of the intermediate element are preferably made from boron nitride or aluminium nitride. In particular, boron nitride has thermal and electrical characteristics that are perfectly suitable for implementation of the invention. Furthermore, manufacturing boron nitride pellets makes it possible to obtain a compact intermediate element.

For anticorrosion purposes, the sheath is preferably made from metal that is non-oxidisable in demineralised water, typically water at 350° C. or even 600° C. in transient regime. Preferably, it is 316L stainless steel or a nickel/chromium/iron alloy, with a proportion of nickel, by weight, greater than 50%, preferably with a composition with at least 72% nickel, 14% to 17% Cr, and 6% to 10% iron (an alloy also called Inconel 600; there may be a few supplementary elements, in small proportions, such as Mn (1% maximum), and/or Cu (0.5% maximum), and/or Si (0.5% maximum), and/or C, and/or S).

The two electrical connections are preferably solid pieces that allow an advantageous insertion of thermocouples in the sheath as explained below. Preferably, these solid pieces are made from cuprous or nickel conductive material or molybdenum if heat treatments at high temperature, particularly an overhardening, prove necessary.

The device according to the invention advantageously constitutes a device for electrical simulation of a nuclear fuel rod.

It then comprises a plurality of thermocouples, advantageously each inserted in a groove formed on the external periphery of the sheath. Thus, unlike the electrical simulation devices according to the prior art, the thermocouples can be positioned with great precision. These are typically N-type with an Inconel 600 sheath.

Another object of the invention is a method for producing a device for the electrical heating of a liquid, said device comprising:

a first tube made from electrically conductive material forming a resistor, two electrical connections each fitted in one of the ends of the resistor, the electrical connections being adapted to bring a continuous current through the resistor and to make it emerge respectively, an intermediate element, made from material that is both thermally conductive and electrically insulating, surrounding, with direct mechanical contact, respectively the resistor and the two electrical connections over at least part of their length, a second tube forming a sheath, made from thermally conductive material and surrounding the thermally conductive intermediate element with direct mechanical contact, the sheath being intended to be immersed, over at least a major part of its length, in the liquid to be heated, the method being characterised in that it comprises at least one step of restraining the sheath on the intermediate element and the resistor in order to obtain a tight fit between them.

The restraining step also makes it possible advantageously to densify the electrically insulating intermediate element by increasing its thermal conductivity.

Three alternative variants can be envisaged for performing the restraining step:
  either by a technique of hammering the outside diameter of the sheath: the various mounting clearances between resistor, solid insulating intermediate element and sheath are then filled in by reducing the outside diameter obtained by the hammering, and this with axial expansion,
  or by putting the inside diameter of the resistor under isostatic pressure: the various mounting clearances between resistor, solid insulating intermediate element and sheath are then filled in by expansion of the inside diameter by the isostatic pressure, and this without axial expansion,
  or by thermal banding, by heating the sheath by Joule effect while cooling the resistor by an internal flow of heat-transfer agent, throughout the duration of the step. In this variant, the electrical connections must be pierced, preferably to 3 mm.

For the restraining variants by means of hammering or isostatic pressure (hydrostatic expansion), these steps can be performed at least over the length of the sheath, with the electrical connections in place, and an extension can be added to the latter.

Another subject matter of the invention is a method for producing a device for the electrical heating of a liquid, said device comprising:
  a first tube made from electrically conductive material forming a resistor,
  two electrical connections each fitted in one of the ends of the resistor, the electrical connections being adapted to bring a continuous current through the resistor and to make it emerge respectively,
  an intermediate element, made from material that is both thermally conductive and electrically insulating, surrounding, with direct mechanical contact, respectively the resistor and the two electrical connections over at least part of their length,
  a second tube forming a sheath, made from thermally conductive material and surrounding the intermediate element with direct mechanical contact, the sheath being intended to be immersed, over at least a major part of its length, in the liquid to be heated,
  the method being characterised in that it comprises successively at least one step of deposition of a ceramic material of the intermediate element on the resistor by thermal spraying, a step of grinding of the intermediate element sprayed on the resistor, a step of deposition of metal sheath material on the intermediate element by thermal spraying and finally a step of grinding the metal sheath.

The thermal spraying techniques used in the context of the invention may be all the techniques of surface deposition of metals for the sheath or ceramic for the intermediate element compatible with the required specifications, such as vapour deposition, liquid deposition, electrolysis, epitaxy, etc.

The sprayed elements may be ground with a very small thickness in order to compensate for their relatively low conductivity. The inventors think that zirconia and alumina are particularly suited to a thermal spraying step and a grinding step.

In order to obtain a device for the electrical simulation of a nuclear fuel rod according to the invention with high homogeneous thermal flow, it is necessary to ensure mainly that the internal maximum temperatures are controlled, linked to the geometry and the materials, and to the interface thermal resistances.

It is thus ensured that the radial distance to be crossed by the thermal flow emitted by the resistor is minimised, and then the choice of the materials making up the resistor, sheath and intermediate element makes it possible to maximise their thermal conduction.

Finally, by virtue of the methods according to the invention, the interface thermal resistances are reduced by radial compression obtained by the restraining of the sheath on the whole device or by the thermal spraying of the various elements.

A plurality of longitudinal grooves are also advantageously produced on the outside diameter of the sheath in order to insert a thermocouple therein, in each one, in order to constitute a device for electrical simulation of a nuclear fuel rod.

The thermocouples thus inserted in the sheath at various azimuthal and longitudinal positions are thus positioned very precisely, typically of the order of 1 millimeter.

BRIEF DESCRIPTION OF THE DRAWINGS

Other advantages and features of the invention will emerge more clearly from a reading of the detailed description of an embodiment of the invention given, for illustrative and non-limitative purposes, with reference to the figures, among which.

DETAILED DISCLOSURE OF PARTICULAR EMBODIMENTS

It is stated here that the electrical simulation devices according to the prior art (FIG. 1) and according to the invention (FIGS. 2 and 3) must make it possible to detect the occurrence of the boiling crisis, defined as a significant excursion in wall temperature for a small variation in the thermohydraulic control parameters.

Figure 1:
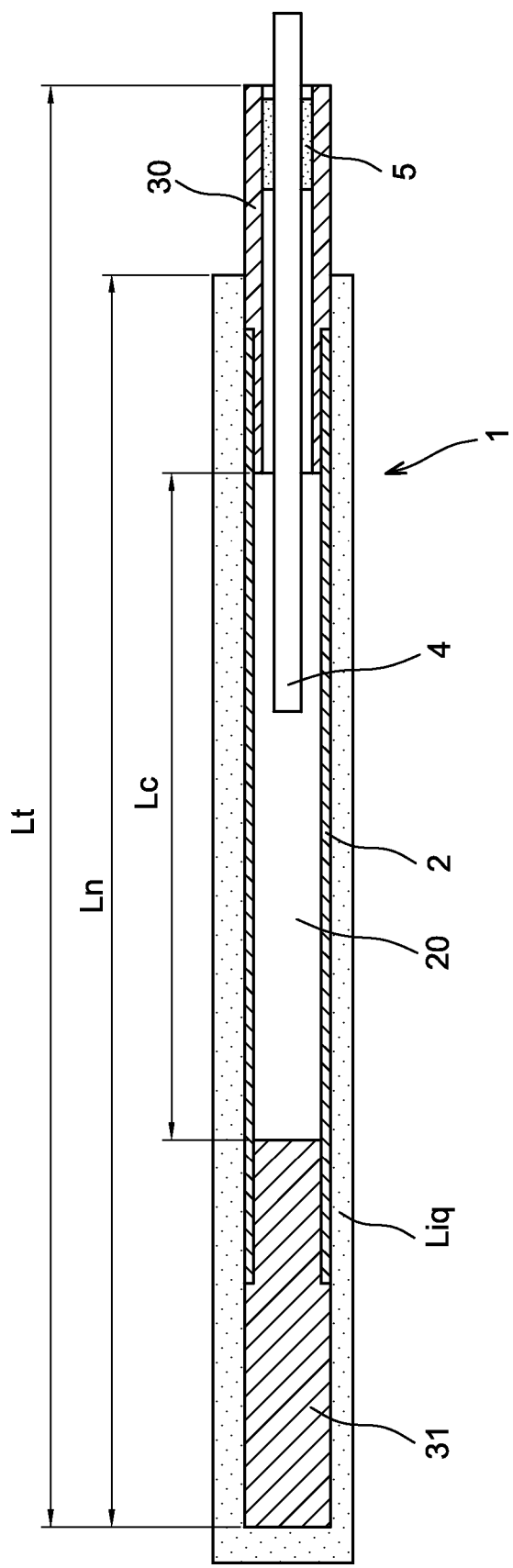
FIG. 1 is a view in longitudinal section of a device for the electrical simulation of a nuclear fuel rod according to the prior art.
Figure 2:
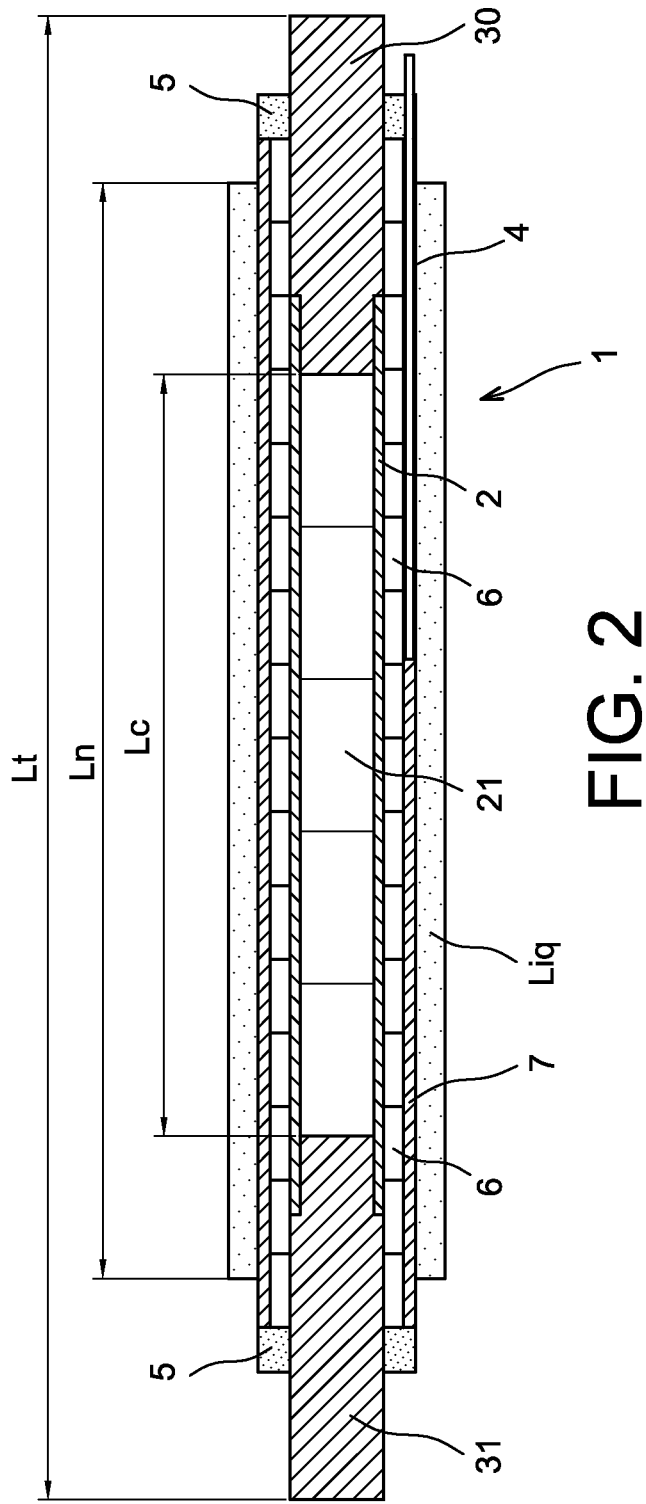
FIG. 2 is a view in longitudinal section of a device for the electrical simulation of a nuclear fuel rod according to a first embodiment of the invention.
Figure 3:
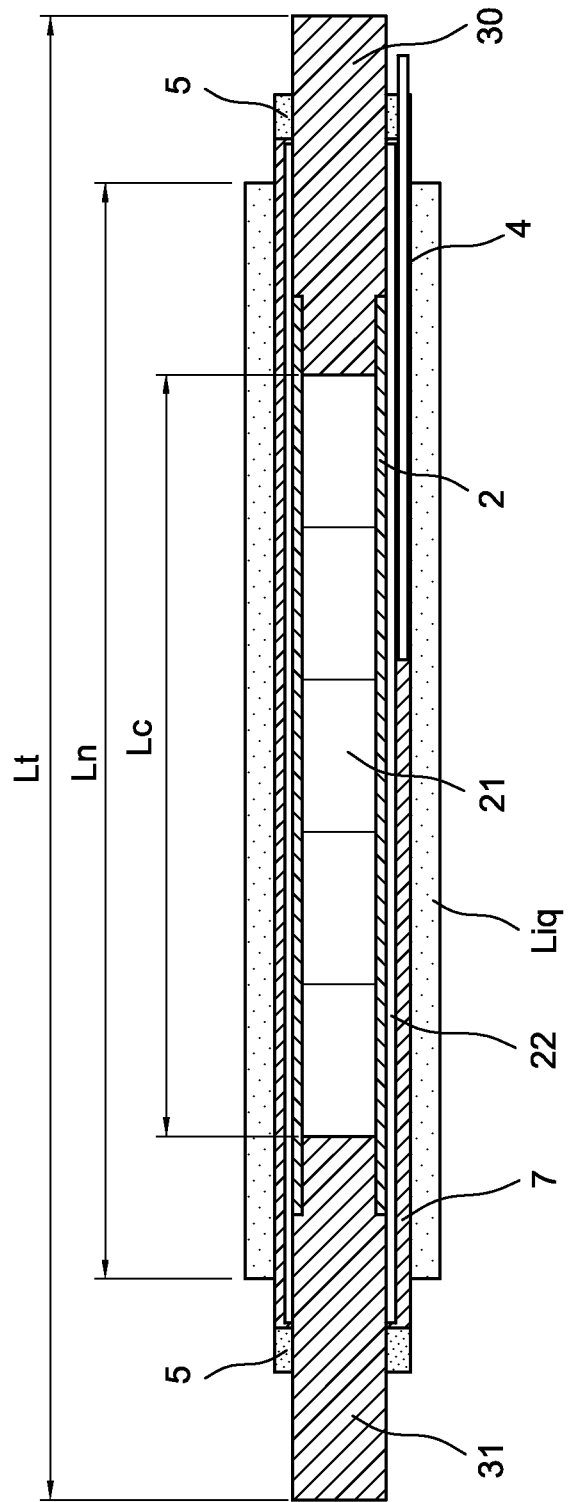
FIG. 3 is a view in longitudinal section of a device for the electrical simulation of a nuclear fuel rod according to a second embodiment of the invention.

It is also stated that, in all of FIGS. 1 to 3, the reference Lt, Ln and Lc designate respectively:
  Lt: overall length of the device;
  Ln: length of the device immersed in the liquid;
  Lc: heating length of the device.

It should be noted that the mounting of the electrical simulation device according to the prior art (FIG. 1) makes provision for immersing and electrical connection whereas the mounting of the electrical simulation device according to the invention (FIGS. 2 and 3) makes it possible to not immerse any electrical connection, which is advantageous since it is not necessary to effect a sophisticated electrical insulation with respect to the external environment.

It is also stated that, in order to carry out the boiling crisis tests, an electrical simulation device according to the invention is arranged in an assembly (not shown) of a plurality of identical devices with holding grids in a vessel (not shown) containing the liquid to be heated, the two electrical connections projecting from the vessel while being isolated therefrom by ad hoc means, and the tubular resistor is fed with direct current. For pressurised water reactors, the liquid to be heated is water. For other applications, the liquid to be heated may be different. Typically, for RNR-Na rapid neutron reactors, the liquid to be heated is sodium.

For these boiling crisis tests the following parameters are imposed on each electrical simulation device:
  heating length Lc, typically from 1 to 4.3 meters;
  axial thermal flow profile per rod, typically from 0.2 to 3 MW/m$^2$;
  sheath outside diameter typically from 8.5 to 12.9 mm;
  total electrical power, typically 0.5 to 10 MW.

Likewise, for these tests, the following parameters are imposed on the assembling together of several electrical simulation devices:
  the type and positions of the holding grids, defining the type and pitch of the array of an assembly,
  with a reduced number of devices per assembly, typically a number from 19 to 37.

The operating conditions of the liquid to be heated referenced Liq in the figures (demineralised water) are as follows:
  pressure from 1 to 172 bar,
  temperature from 50° to 350° C.,
  a flow rate from 0.1 to 40 kg/s, under the thermal flow and total power conditions applied to each device as detailed above.

For reasons of clarity, the same elements of the device according to the prior art and according to the invention bear the same references.

FIG. 1 shows an electrical simulation device according to the prior art, of the direct heating type. The device 1 according to the prior art consists of a resistor 2 in the form of a tube that also serves as a sheath. In other words, the tubular sheath 2 also has the function of electrical resistor, that is to say the part supplied with current to heat the liquid in which the device is immersed. The interior 20 of the resistor/tubular sheath 2 is filled with pressurised nitrogen. Two electrical connections 30, 31 are each fitted in one of the ends of the sheath/resistor 2. One of the connections 30 is the one supplying current: it is pierced at its centre to house the instrumentation thermocouples 4 that extend longitudinally along the axis of the device in the interior 20 of the sheath.

On this side, the impermeability of the pressurised nitrogen on the interior 20 of the sheath 2 is ensured both by the connection 30 itself and by an end plug 5 made from electrically insulating material. The other one 31 of the connections is the current output connection: it is solid and therefore also serves as a sealing plug.

The major drawbacks of the electrical simulation device according to the prior art, of the direct heating type, as shown in FIG. 1 can be detailed as follows:
  there exist numerous constraints in mounting the device in the test vessel,
  in the case of the use of holding grids, these constitute current diversions that may very quickly degrade the sheath/resistor 2 heated directly by the supply current: this may prevent the finalisation of the tests. This is all the more true for holding grids of modern design, since they are thicker and especially higher than holding grids of an older design;
  it cannot be used to carry out boiling crisis tests on a liquid with high electrical conductivity, such as sodium, envisaged on 4th generation RNR-Na reactors.

To remedy these drawbacks while keeping the possibility of achieving high thermal flows, of several MW/m$^2$, necessary for the qualification of fuels and the same metrological qualities as a device 1 according to the prior art, the inventors thought first of all of decoupling the sheath function from the resistor function of the device.

Thus the device 1 according to the invention consists essentially of:
  a resistor 2 of the same type of tubular resistor as the one of the device 1 according to the prior art, shown in FIG. 1, so as to have a high thermal flow with an axial profile imposed solely by the variation in thickness of the resistor and a homogeneous transverse profile, that is to say without any azimuthal variation,
  radial dimensions of the tubular resistor that are reduced in order to insulate it electrically by means of an added intermediate element 6, 22 that is electrically insulating but thermally conductive, preferably with a very high thermal conduction coefficient,
  a sheath 7 made from thermally conductive material that jackets the assembly consisting of tubular resistor 2 and intermediate element 6, 22, the outside diameter of said sheath being the one imposed as indicated above (8.5 to 12.9 mm), that is to say that of the nuclear fuel rod sheaths intended for PWR reactors.

Furthermore, according to the invention, the tubular resistor 2 is supplied with direct current by the connection 30. For applications other than the qualification of nuclear fuel, the electrical supply may be done in single-phase alternating current.

The embodiment in FIG. 2 provides, as an electrically insulating and thermally conductive intermediate element, a column of pellets 6 pierced at their centre, stacked on top of one another, and fitted around the tubular resistor 2 over its entire length and over part of the electrical connections 30, 31.

The embodiment in FIG. 3 provides, as an electrically insulating and thermally conductive intermediate element, a ceramic cladding 22 deposited in liquid form deposited by spraying (thermal spraying) directly on the tubular resistor 2.

Ceramic mechanical inserts 21 are stacked inside the resistor 2 in order to support its wall, in particular when the sheath stretches during a step of restraining by hammering. It is also possible to provide pressurised gas instead of the ceramic inserts 21.

Whatever the embodiment illustrated, in order to reduce the interface thermal resistances between resistor 2/intermediate insulating element 22, 6/sheath 7 as much as possible, a radial compression is carried out on the assembly obtained by a restraining of the sheath 2 on the rest 22, 6; 7 of the device 1. This restraining operation also advantageously makes it possible to densify the electrically insulating intermediate element in the form of stacked pellets 6 by increasing their thermal conductivity.

The measuring instrumentation for performing the boiling crisis tests is provided by thermocouples, preferably eight N-type thermocouples 4 sheathed with Inconel 600 (nickel/chrome/iron alloy, with a composition of at least 72% nickel, 14% to 17% Cr, 6% to 10% iron; there may be a few supplementary elements, in small proportions, such as Mn (1% maximum), and/or Cu (0.5% maximum), and/or Si (0.5% maximum), and/or C, and/or S), each arranged in different axial and azimuthal positions at specified points with a tolerance of ±2 mm.

Advantageously, as shown in FIGS. 2 and 3, each thermocouple 4 is inserted, after the restraining step, directly in a groove formed on the outside diameter of the sheath 7. It is thus possible to position the thermocouples very precisely with the above tolerance.

Sealing elements 5 made from resin are provided around each electrical connection 30, 31 in order to electrically insulate the resistor 2 and its connections 30, 31 from the sheath 7.

By way of example, electrical simulation devices 1 according to the invention are envisaged with the dimensions and materials as follows:

Dimensions of the Device 1 According to FIGS. 2 and 3:
  Complete device 1:
    immersed length Ln: 1.2 to 4.5 m;
    total length Lt: 1.5 to 4.8 m
  Sheath 7:
    outside diameter: 8.5 to 12.9 mm,
    thickness: ~1 mm,
  Resistor 2:
    heating length Lc: 1 to 4.3 m,
    outside diameter less than the inside diameter of the sheath 7 by approximately 2 mm (FIG. 2),
    outside diameter less than the inside diameter of the sheath 7 by approximately 0.5 mm (FIG. 3),
    inside diameter according to the electrical resistance in question,
  Electrically insulating and thermally conductive intermediate element:
    thickness of pellets 6 (FIG. 2): approximately 2 mm,
    thickness of ceramic cladding 22, approximately 0.5 mm,
  Thermocouple 4 with sheath: diameter approximately 0.5 mm Materials of the Device 1 According to FIGS. 2 and 3:
  Sheath 7: Inconel 600 or 316 L stainless steel,
  resistor 2: Inconel 600 or 70/30 cupronickel,
  electrically insulating and thermally conductive intermediate element: stacked pellets 6 made from boron nitride or aluminium nitride and zirconia ceramic cladding 22,
  thermocouple 4: sheath made from Inconel 600 or 316 L stainless steel,
  electrical connections 30, 31: copper, nickel, or molybdenum,
  ceramic inserts 21: magnesia or alumina or zirconia,
  electrically insulating sealing elements 5: resin or silicone if the local temperature remains relatively low.

Although described solely as a device for electrical simulation of a nuclear fuel rod for performing boiling crisis tests, the device according to the invention 1 that has just been described in FIGS. 2 and 3 may just as well constitute in more general terms a device for the electrical heating of a liquid, more particularly when a high thermal flow is required, typically up to a few MW/m$^2$.

Thus a device according to the invention may advantageously replace the currently existing heating tubes the surface power of which is limited:
  by its design technology when this involves temperatures within it that are too high because of the materials used solely for thermal reasons or because of lack of electrical insulation,
  by the exchange capacities of the surrounding heat-transfer fluid, related to its intrinsic physical properties (thermal conductivity, viscosity, etc.) or its flow conditions (low flow rates, high temperatures, etc.).

In the case where a device according to the invention is actually used as a heating device, its two ends serve for the electrical supply.

The invention claimed is:

1. Device for the electrical heating of liquid comprising:
   a first tube made from electrically conductive material forming a resistor,
   two electrical connections, each fitted in one of the ends of the resistor, one of the electrical connections being adapted to bring a direct current through the resistor and the other electrical connection being the current output connection,
   an intermediate element, made from material that is both thermally conductive and electrically insulating, surrounding, with direct mechanical contact, respectively the resistor and the two electrical connections over at least part of their length,
   a second tube forming a sheath, made from thermally conductive material and surrounding the thermally conductive intermediate element with direct mechanical contact, the sheath being intended to be immersed, over at least a major part of its length, in the liquid to be heated.

2. Device for the electrical heating of liquid according to claim 1, wherein the direct mechanical contacts both between intermediate element and resistor and between intermediate element and sheath are tight fits.

3. Device for the electrical heating of liquid according to claim 1, also comprising one or more mechanical inserts housed inside the resistor, the mechanical insert or inserts being adapted to enable mechanical support of the tubular resistor.

4. Device for the electrical heating of liquid according to claim 3, wherein the mechanical insert or inserts is or are made from ceramic, such as magnesia, alumina or zirconia.

5. Device for the electrical heating of liquid according to claim 1, wherein the tubular resistor is made from a nickel/chromium/iron alloy, with a proportion of nickel, by mass, of at least 72% nickel, 14% to 17% Cr and 6% to 10% iron or made from 70/30 cupronickel alloy.

6. Device for the electrical heating of liquid according to claim 1, wherein the electrically insulating and thermally conductive intermediate element consists of a column of a plurality of pellets pierced at their centre and stacked on one another.

7. Device for the electrical heating of liquid according to claim 6, wherein the pellets of the intermediate element are made from boron nitride or aluminium nitride.

8. Device for the electrical heating of liquid according to claim 1, wherein the sheath is made from metal that is non-oxidisable in demineralised water.

9. Device for the electrical heating of liquid according to claim 8, wherein the sheath is made from a nickel/chromium/iron alloy, with a proportion of nickel, by mass, of at least 72% nickel, 14% to 17% chromium and 6% to 10% iron or made from 316 L stainless steel.

10. Device for the electrical heating of liquid according to claim 1, wherein the two electrical connections are solid pieces.

11. Device for the electrical heating of liquid according to claim 10, wherein the two electrical connections are made from copper, nickel or molybdenum.

12. Device for the electrical heating of liquid according to claim 1, constituting a device for the electrical simulation of a nuclear fuel rod.

13. Device for the electrical simulation of a nuclear fuel rod according to claim 12, comprising a plurality of thermocouples, each inserted in a groove formed on the external periphery of the sheath.

14. Device for the electrical simulation of a nuclear fuel rod according to claim 13, wherein the thermocouples are N-type with a sheath made from a nickel/chromium/iron alloy, with a proportion of nickel, by mass, of at least 72% nickel, 14% to 17% of chromium and 6% to 10% iron.

15. Method for producing a device for the electrical heating of a liquid, said method comprising:
providing a first tube made from electrically conductive material forming a resistor,
providing two electrical connections, each fitted in one of the ends of the resistor, one of the electrical connections being adapted to bring a direct current through the resistor and the other electrical connection being the current output connection,
providing an intermediate element, made from material that is both thermally conductive and electrically insulating, surrounding, with direct mechanical contact, respectively the resistor and the two electrical connections over at least part of their length,
providing a second tube forming a sheath, made from thermally conductive material and surrounding the thermally conductive intermediate element with direct mechanical contact, the sheath being intended to be immersed, over at least a major part of its length, in the liquid to be heated, and
restraining the sheath on the intermediate element and the resistor in order to obtain a tight fit between them.

16. Production method according to claim 15, wherein the restraining step is performed by a technique of hammering the outside diameter of the sheath.

17. Production method according to claim 15, wherein the restraining step is performed by putting the inside diameter of the resistor under isostatic pressure.

18. Production method according to claim 15, wherein the restraining step is performed by thermal banding, by heating the sheath by Joule effect while cooling the resistor by an internal flow of heat-transfer agent, throughout the duration of the step.

19. Method for producing a device for the electric heating of a liquid, said device-comprising:
a first tube made from electrically conductive material forming a resistor,
two electrical connections each fitted in one of the ends of the resistor, one of the electrical connections being adapted to bring a direct current through the resistor and the other electrical connection being the current output connection,
an intermediate element, made from material that is both thermally conductive and electrically insulating, surrounding, with direct mechanical contact, respectively the resistor and the two electrical connections over at least part of their length,
a second tube forming a sheath, made from thermally conductive material and surrounding the thermally conductive intermediate element with direct mechanical contact, the sheath being intended to be immersed, over at least a major part of its length, in the liquid to be heated,
the method comprising successively at least a step of deposition of ceramic material of the intermediate element on the resistor by spraying, a step of grinding of the intermediate element thus deposited on the resistor, a step of deposition of metal sheath material on the intermediate element by spraying and finally a step of grinding of the metal sheath.

20. A Production method, wherein, for producing a device for the electrical heating of a liquid said method comprising:
providing a first tube made from electrically conductive material forming a resistor,
providing two electrical connections, each fitted in one of the ends of the resistor, the one of the electrical connections being adapted to bring a direct current through the resistor and the other electrical connection being the current output connection,
providing an intermediate element made from material that is both thermally conductive and electrically insulating, surrounding, with direct mechanical contact, respectively the resistor and the two electrical connections over at least part of their length,
providing a second tube forming a sheath, made from thermally conductive material and surrounding the thermally conductive intermediate element with direct mechanical contact, the sheath being intended to be immersed, over at least a major part of its length, in the liquid to be heated, and
restraining the sheath on the intermediate element and the resistor in order to obtain a tight fit between them,
wherein, once the restraining step or the step of grinding of the metal sheath has been performed, a plurality of longitudinal grooves are produced on the outside diameter of the sheath in order to insert therein a thermocouple in each in order to constitute a device for electrical simulation of a nuclear fuel rod.

* * * * *